United States Patent
Satoh et al.

(10) Patent No.: US 8,208,181 B2
(45) Date of Patent: Jun. 26, 2012

(54) IMAGE READING APPARATUS, DOCUMENT READING APPARATUS, AND IMAGE FORMING APPARATUS

(75) Inventors: Nobuyuki Satoh, Kanagawa (JP); Hiroshi Takahashi, Kanagawa (JP); Masato Kobayashi, Kanagawa (JP); Yuichi Sakurada, Tokyo (JP); Akito Yoshimaru, Kanagawa (JP); Yasuo Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 624 days.

(21) Appl. No.: 12/320,682

(22) Filed: Feb. 2, 2009

(65) Prior Publication Data
US 2009/0195843 A1    Aug. 6, 2009

(30) Foreign Application Priority Data
Feb. 4, 2008    (JP) .................................. 2008-023747

(51) Int. Cl.
*H04N 1/04* (2006.01)
*G06K 9/36* (2006.01)
*G09G 3/16* (2006.01)
*B41J 2/435* (2006.01)

(52) U.S. Cl. ........ 358/475; 382/284; 345/629; 347/234; 347/248

(58) Field of Classification Search .................. 382/284; 345/629; 358/475; 347/234, 248
See application file for complete search history.

(56) References Cited

U.S. PATENT DOCUMENTS

| | | | |
|---|---|---|---|
| 5,144,448 A | 9/1992 | Hornbaker et al. | |
| 6,671,421 B1 * | 12/2003 | Ogata et al. | 382/284 |
| 2007/0206244 A1 | 9/2007 | Kobayashi | |

FOREIGN PATENT DOCUMENTS

| | | |
|---|---|---|
| EP | 0284043 | 9/1988 |
| EP | 2056581 | 5/2009 |
| JP | 55-129869 | 10/1980 |
| JP | 56-126373 | 10/1981 |
| JP | 62-101170 | 5/1987 |
| JP | 2000-358140 | 12/2000 |
| JP | 2006-25289 | 1/2006 |

OTHER PUBLICATIONS

Search Report dated Jun. 3, 2009 issued in corresponding European Application No. 09250279.8.

* cited by examiner

*Primary Examiner* — Charlotte M Baker
*Assistant Examiner* — Justin Katzwhite
(74) *Attorney, Agent, or Firm* — Harness, Dickey & Pierce, P.L.C.

(57) ABSTRACT

An image reading apparatus is disclosed that includes plural line image sensors partially overlapped with each other in an overlapped reading portion, the image reading apparatus characterized by: plural light sources disposed so as to face the overlapped reading portion; a light source turn-on unit sequentially and independently turning on the light sources; an optical unit converging each light emitted from the light sources onto the overlapped reading portion; and a position shift detecting unit detecting a position shift of a reading position of the line image sensors in the overlapped reading portion based on data of the overlapped reading portion.

14 Claims, 14 Drawing Sheets

FIG.9A

IMAGE DATA VALUE IN OVERLAPPED READING PORTION
(READING OPTICAL SYSTEM A)

| NO OF LIGHT EMITTING SECTIONS (LIGHT NO) \ PIXEL NO | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 1 | 7 | 13 | 8 | 2 | 0 | 0 |
| 2 | 0 | 0 | 0 | 5 | 20 | 50 | 80 | 50 | 20 | 5 | 0 |
| 3 | 0 | 0 | 4 | 20 | 80 | 130 | 180 | 130 | 80 | 20 | 4 |
| 4 | 0 | 5 | 40 | 70 | 110 | 180 | 220 | 180 | 110 | 70 | 40 |
| 5 | 0 | 0 | 10 | 20 | 80 | 130 | 180 | 130 | 80 | 20 | 10 |
| 6 | 0 | 0 | 0 | 5 | 20 | 50 | 80 | 50 | 20 | 5 | 0 |
| 7 | 0 | 0 | 0 | 0 | 3 | 11 | 20 | 11 | 3 | 0 | 0 |
| 8 | 0 | 0 | 0 | 0 | 0 | 4 | 10 | 4 | 0 | 0 | 0 |
| 9 | 0 | 0 | 0 | 0 | 0 | 0 | 3 | 0 | 0 | 0 | 0 |
| 10 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 |

FIG.9B

IMAGE DATA VALUE IN OVERLAPPED READING PORTION
(READING OPTICAL SYSTEM B)

| LIGHT NO \ PIXEL NO | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 5 | 0 | 0 | 0 | 0 | 0 | 0 |
| 4 | 0 | 0 | 1 | 7 | 13 | 8 | 2 | 0 | 0 | 0 | 0 |
| 5 | 0 | 5 | 20 | 50 | 80 | 50 | 20 | 5 | 0 | 0 | 0 |
| 6 | 4 | 20 | 80 | 130 | 180 | 130 | 80 | 20 | 4 | 0 | 0 |
| 7 | 40 | 70 | 110 | 180 | 220 | 180 | 110 | 70 | 40 | 10 | 0 |
| 8 | 10 | 20 | 80 | 130 | 180 | 130 | 80 | 20 | 10 | 0 | 0 |
| 9 | 0 | 5 | 20 | 50 | 80 | 50 | 20 | 5 | 0 | 0 | 0 |
| 10 | 0 | 0 | 3 | 11 | 20 | 11 | 3 | 0 | 0 | 0 | 0 |
| 11 | 0 | 0 | 0 | 4 | 10 | 4 | 0 | 0 | 0 | 0 | 0 |
| 12 | 0 | 0 | 0 | 0 | 3 | 0 | 0 | 0 | 0 | 0 | 0 |

NO OF LIGHT EMITTING SECTIONS (LIGHT NO)

IMAGE READING APPARATUS, DOCUMENT READING APPARATUS, AND IMAGE FORMING APPARATUS

BACKGROUND OF THE INVENTION

1. Field of the Invention

The present invention generally relates to an image reading apparatus including plural line image sensors reading the same data in an overlapped reading portion and capable of joining the image data in the overlapped reading portion to read the entire image data, and a document reading apparatus and an image forming apparatus having the image reading apparatus.

2. Description of the Related Art

In an image reading apparatus, the document image width of the A0 size is typically about 840 mm. Therefore, when the whole A0 size document is read by a single CCD line image sensor under 600 dpi resolution, as many as approximately 20,000 pixel image sensors are required to be arranged on the single line image sensor. However, a line sensor having such a large number of pixels may be difficult to be manufactured with current technology at reasonable costs, namely the manufacturing cost of such a line sensor may be very high.

Therefore, in a document reading apparatus configured to be capable of reading an A0 size and/or A1 size document, there has been widely used a method of reading an image in which plural CCD line sensors are arranged partially overlapping each other in an overlapped reading portion in the main scanning direction, and image data of the overlapped reading area is joined to each other to obtain the entire image data (see, for example, Patent Documents 1 and 2).

However, in a case where this method is employed, even when the overlapped reading portion of the line sensors is strictly adjusted in its manufacturing process, the data of the overlapped reading portion may be slightly out of alignment between the adjoining CCD line sensors (i.e., image data signal detected by adjoining CCD line sensors may not be adaptively joined to each other) due to vibration during transportation, being out of alignment in its main body of the system during its mounting, or the like. Under such conditions, when an image is read, the image may be deformed because the image data in the overlapped reading portion are not adaptively joined to each other.

Further, the conjugation length of the image forming optical system of the image reading apparatus typically requires approximately 500 mm to 800 mm, and the reduction ratio of the optical system becomes approximately 1/15. Therefore, if the CCD line sensor is misaligned by 10 μm, the image on the surface of a document may be misaligned by as much as 150 μm. This misalignment may also be caused by a thermal expansion due to the temperature change in the image reading apparatus. Such misalignment (position shift) may occur in both the main scanning direction and the sub scanning direction.

To overcome the problem, Patent Document 3 discloses a technique in which a marking is formed by using an LED in the overlapped reading portion of the CCD line image sensors, and the whole image forming optical system is configured to be mechanically moved in the sub scanning direction to detect the relative position of the optical systems, and a sub scanning position is adjusted so that the position shift can be minimized.

Further, Patent Document 4 proposes a technique in which a misalignment (position shift) in the main scanning direction is detected using a correction projection line extending in the direction parallel to the sub scanning direction, and a misalignment in the sub scanning direction is detected using two projection lines not parallel to the correction projection line, and image data are joined by finely adjusting the line synchronization of the CCD driving clock.

Further, the applicant of the present invention has proposed a configuration capable of accurately detecting the position shift (misalignment) in the sub scanning direction without moving the entire optical system by enabling a reference pattern for detecting the misalignment to be moved (Japanese Patent Application No. 2007-281540).

Patent Document 1: Japanese Patent Application Publication No.: S62-101170
Patent Document 2: Japanese Patent Application Publication No.: S56-126373
Patent Document 3: Japanese Patent Application Publication No.: 2000-358140
Patent Document 3: Japanese Patent Application Publication No.: 2006-25289

However, when such a technique as proposed in Patent Document 3 is employed, there may arise a problem that the line image sensors are required to be mechanically moved, and guide rods and cams are required to be provided to guide the line image sensors, thereby increasing the cost and impairing the durability of the image reading apparatus in response to the additional feature.

In addition, even when the image data in the overlapped reading portion are adaptively adjusted, the parallelism between the optical systems may be degraded by the position shift (misalignment) of the optical system due to a fact that the guide rods become loose and the like. Further, in order to detect the position shift, the line image sensors are required to be moved back and forth to detect the peak position of the line image sensors. Therefore, it may take time to complete the adjustment process, namely, a long wait time may be required.

In the apparatus described in Patent Document 4, when the position shift in the sub scanning direction is detected, each of the outer width of the two non-parallel lines are measured, so that the difference between those outer widths is obtained and the misalignment amount in the sub scanning direction is detected based on the difference. Because of this feature, if there is a magnification error in the optical system, the error in the position measurement increases in proportion to the amount of the magnification error.

Further, according to Patent Document 4, the center position of the pattern is detected by assuming that 50% of the peak value is the center value. Therefore, in a case where the illumination in the projection pattern is uneven, the center position may not be accurately obtained. Further, the position is calculated without using any interpolation with respect to the edge portions of the projection pattern, therefore, the position can be detected with at most one dot accuracy (see FIGS. 7 and 8 in Patent Document 4).

Further, the projection position of the correction pattern may be slightly shifted due to thermal environmental change. As a result, even if relative alignment in the overlapped reading portion is performed, the absolute positions of the sensors may also be shifted due to the shifted correction pattern.

In the configuration proposed in Japanese Patent Application No. 2007-281540, it is configured that only the optical path of the reference pattern can be moved. Therefore, the moving portion is very limited, which is advantageous from both durability and accuracy points of view. However, there still remains a mechanical moving portion, therefore, an impact resistance and a vibration resistance may be reduced.

SUMMARY OF THE INVENTION

According to an embodiment of the present invention, there are provided an image reading apparatus, a draft reading apparatus, and an image forming apparatus that may have at least one of the following characteristics:

(1) without moving the entire optical system, the position of the optical system may be accurately aligned at low cost and with high durability;
(2) without moving the entire optical system back and forth, alignment may be completed in a short time period;
(3) even the optical systems have an magnification error, accurate alignment (correction of the position shift) may be performed;
(4) the accuracy of the measurement for alignment may be improved, thereby enabling a highly accurate alignment;
(5) even if the absolute position of the projection pattern is shifted due to thermal deformation and the like, the provided joining optical system may accurately join the absolute positions; and
(6) without necessitating any mechanical driving unit, the provided optical system may include a mechanism having an excellent durability and impact resistance for detecting misalignment.

According to an aspect of the present invention, there is provided an image reading apparatus including plural line image sensors aligned in a main scanning direction and partially overlapped with each other in an overlapped reading portion, wherein image data to be read are imaged on the line image sensors and entire image data are read by joining image data in the overlapped reading portion read by the line image sensors. The image reading apparatus including plural light sources disposed so as to face the overlapped reading portion of the image data to be read by the line image sensors and cross over the overlapped reading portion;

a light source turn-on unit configured to sequentially and independently turn on the light sources;

an optical unit configured to converge each light emitted from the light sources onto the overlapped reading portion; and a position shift detecting unit configured to detect a position shift of a reading position of the line image sensors in the overlapped reading portion based on data of the overlapped reading portion read by the line image sensors.

By adopting this configuration, plural light sources are provided that are independently turned ON to provide a projection pattern onto the overlapped reading portion, and while the plural lights are sequentially tuned ON and OFF, the position shift in a joining section which is the overlapped reading portion of the line image sensors is measured. Then, based on the measured position shift, the position shift is corrected. According to the configuration of the image reading apparatus, since there is no mechanically moving section, the position shift may be detected in an extremely short time period, thereby allowing a reduction in downtime of the apparatus. Further, a position shift in the sub scanning direction may be detected. As a result, the optical system having high accuracy and high durability may be provided at a lower cost.

In the image reading apparatus according to an embodiment of the present invention, it becomes possible to measure and correct a position shift (misalignment) of the joining section which is the overlapped reading portion between the line image sensors by providing plural light sources that can be independently turned ON and OFF so that the light sources are sequentially turned ON to form a light projection pattern on the overlapped reading portion. Because of this feature, there is no mechanically moving section. Therefore, the position shift may be detected in a short time period, thereby allowing a reduction in downtime of the apparatus. Further, a position shift in the sub scanning direction may be detected.

As a result, the optical system having high accuracy and high durability may be provided at a lower cost.

Further, by employing the configuration of the image reading apparatus according to an embodiment of the present invention, though the plural image sensors of the corresponding optical systems are provided in the document reading section, it may become possible to have reliability and accurately join high-quality image data and provide an image forming apparatus capable of forming high-quality images.

BRIEF DESCRIPTION OF THE DRAWINGS

Other objects, features, and advantages of the present invention will become more apparent from the following description when read in conjunction with the accompanying drawings, in which:

FIGS. 9A and 9B are tables showing image data values detected by the line image sensors 21 and 22, respectively;

DETAILED DESCRIPTION OF THE PREFERRED EMBODIMENTS

In the following, embodiments of the present invention are described with reference to accompanying drawings.

Figure 1:
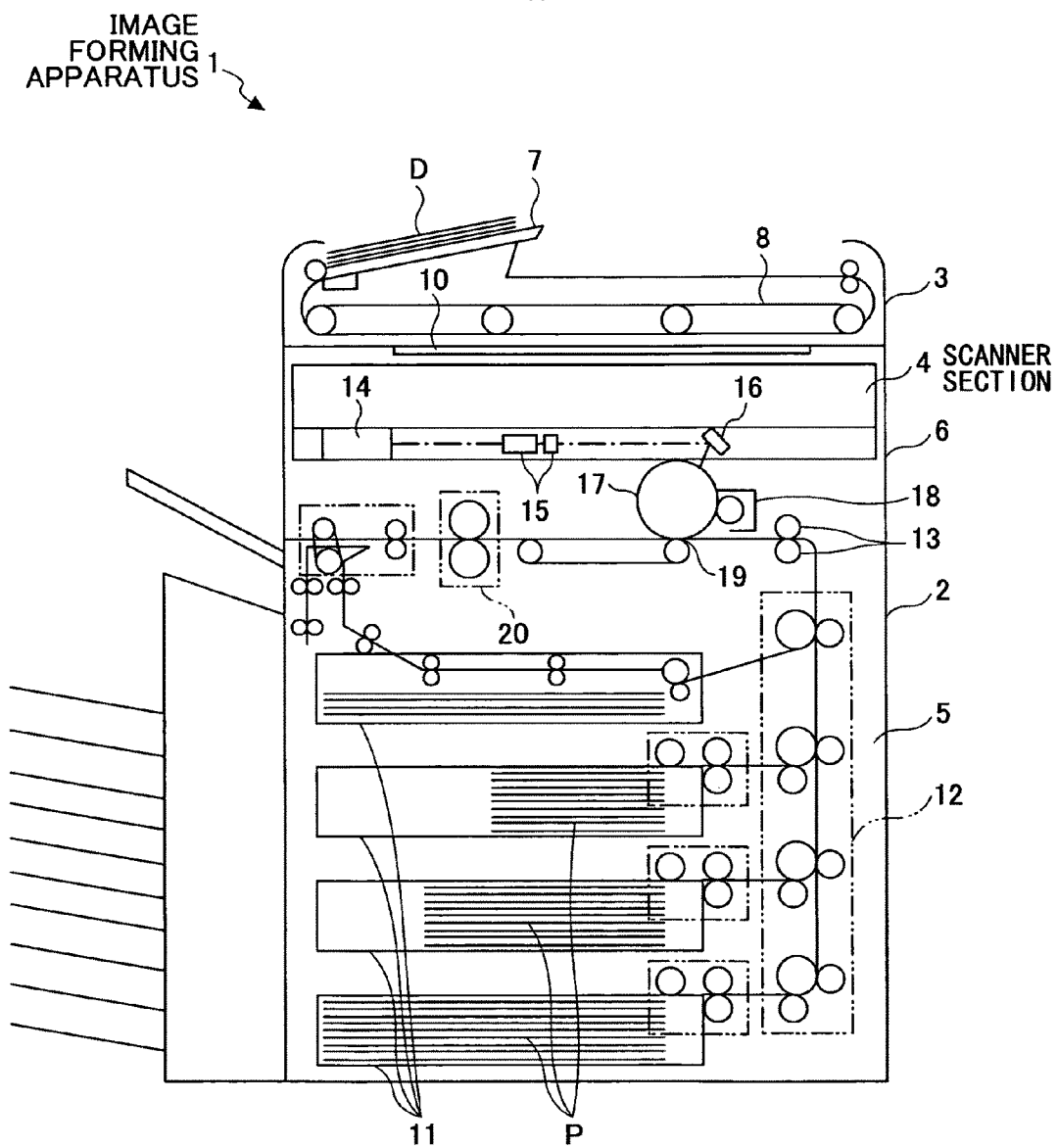
FIG. 1 is a schematic perspective view showing an image forming apparatus according to an embodiment of the present invention.

FIG. 1 schematically shows a configuration of an image forming apparatus 1 according to an embodiment of the present invention. The image forming apparatus 1 may be a copier, a facsimile machine, and the like As shown in FIG. 1, the image forming apparatus 1 includes an apparatus main body 2, and an automatic document feeder (ADF) 3 disposed on the apparatus main body 2. The apparatus main body 2 includes a scanner section 4 serving as an image reading apparatus, a sheet feeding section 5, and an image forming section 6.

The ADF 3 includes a document positioning plate 7 and a document feeding device 8 including a feeding belt. The document positioning plate 7 is disposed on the upper side of the image forming apparatus 1 and documents D are positioned on the document positioning plate 7. The document feeding device 8 feeds the documents on the document positioning plate 7 one by one onto a contact glass 10 on the upper side of the scanner section 4. Further, the document feeding device 8 ejects the document D read (scanned) by the scanner section 4 as described below from the position on the contact glass 10 to the outside of the apparatus main body 2.

The scanner section 4 is disposed under the ADF 3 and includes the contact glass 10 and optical scanning systems as described below. The contact glass 10 is mounted on the upper surface of the apparatus main body 2 so that both upper and lower surfaces of the contact glass 10 are in horizontal planes.

The sheet feeding section 5 includes plural transfer sheet containers 11 on the lower side of the apparatus main body 2 and a transfer sheet supply feeding section 12. Each transfer sheet container 11 contains a plurality of transfer sheets P. The transfer sheet supply feeding section 12 feeds the transfer sheets P in the transfer sheet containers 11 one by one to resist rollers 13.

The image forming section 6 includes a laser output unit 14, an imaging lens 15, a mirror 16, the resist rollers 13, a photosensitive drum 17, a developing section 18, a transferring section 19, and a fixing section 20.

The laser output unit 14 includes a laser diode (not shown) as a laser source and a polygon mirror (not shown) to be rotated at a constant fast speed by a motor (not shown). A laser light emitted from the laser output unit 14 is deflected by the polygon mirror, passed through the imaging lens 15, deflected by the mirror 16, and focused and imaged onto an outer peripheral surface of the photosensitive drum 17. The photosensitive drum 17 is exposure-scanned by the laser light in the main scanning direction orthogonal to the rotating direction of the photosensitive drum 17, so that the exposure takes place line by line based on an image signal from the scanner section 4 through an image signal processing section (not shown). By repeating the main scanning at a predetermined cycle in response to the rotating speed and recording density of the photosensitive drum 17, an electrostatic latent image is formed on the surface of the photosensitive drum 17.

On the other hand, the resist rollers 13 send the transfer sheet P into between the transferring section 19 and the photosensitive drum 17, the transfer sheet P being supplied from the transfer sheet containers 11 by the transfer sheet supply feeding section 12. Then, the latent image on the surface of the photosensitive drum 17 is visualized as a toner image by adhesion of toner by the developing section 18. The toner image is transferred onto the transfer sheet P by the transferring section 19. The transfer sheet P on which the toner image is transferred is fed to the fixing section 20 to be heated and pressed in the fixing section 20 so that the transferred toner image is fixed. Then the transfer sheet P on which the toner image is fixed is ejected to a discharge section outside of the apparatus main body 2.

Figure 2:
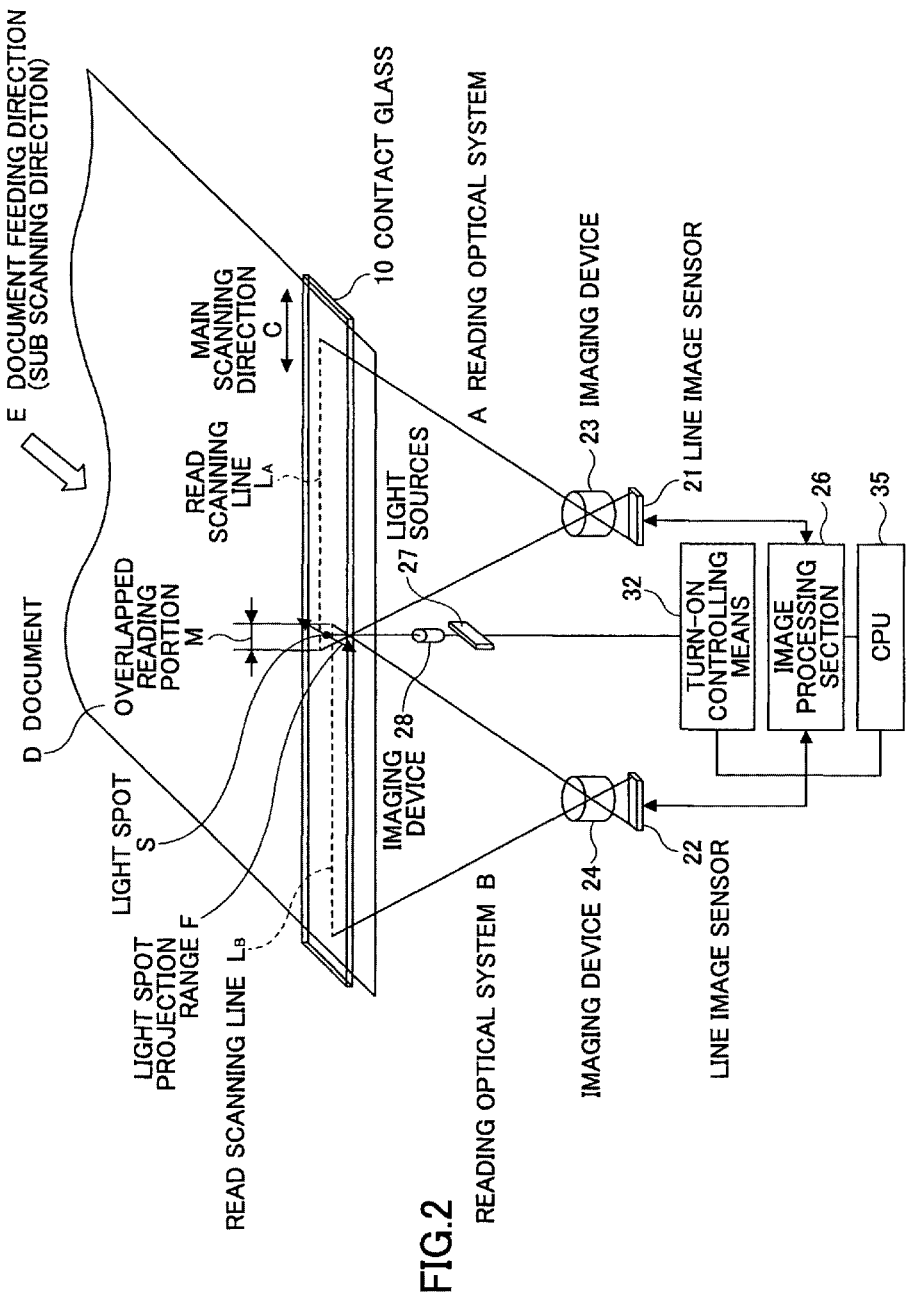
FIG. 2 is a perspective view showing a basic configuration of an image reading apparatus according to an embodiment of the present invention.

FIG. 2 obliquely shows a fundamental configuration of the scanner section 4 according to an embodiment of the present invention. In this exemplary configuration, two reading optical systems A and B are arranged in series. However, the present invention is not limited to this configuration. For example, three or more reading optical systems may be arranged without departing from the generality (scope) of the present invention. As shown in FIG. 2, the reading optical systems A and B include line image sensors 21 and 22, respectively, arranged in a manner so that the line image sensors 21 and 22 partially overlap each other in the main scanning direction C, the line image sensors 21 and 22 including CCDs as photoelectric converters. The reading optical systems A and B further include imaging devices 23 and 24, respectively, such as imaging lenses.

In this scanning section 4 shown in FIG. 2, the document D to be read (scanned) is fed onto the contact glass 10 in the arrow E direction (sub scanning direction) by the ADF 3. The contact glass 10 is substantially uniformly irradiated by an illumination light source (not shown) for reading (scanning) the document D. A reflection light reflected from the document D upon the document D being irradiated is focused and imaged onto light receiving surfaces of the line image sensors 21 and 22 by the imaging devices 23 and 24 in the reading optical systems A and B, respectively. Then line image sensors 21 and 22 read the light as an image data of the document D.

As shown in FIG. 2, the reading optical systems A and B have read scanning lines $L_A$ and $L_B$, respectively, on the contact glass 10. Those read scanning lines $L_A$ and $L_B$ partially overlap each other in an overlapped reading portion M in the main scanning direction C in substantially the center portion of the document D. The image data of the overlapped reading portion M are read by both line image sensors 21 and 22 and joined to each other by data processing in an image processing section 26 so as to read (form) the entire image data of the document D.

The line image sensors 21 and 22 are generally adjusted so as to be aligned at least in the sub scanning direction in the manufacturing (mounting) thereof. In the adjusting process, the positions and the angles of the imaging devices 23 and 24 and line image sensors 21 and 22 are adjusted. simultaneously using actuators (not shown) so that a modular transfer function (MTF) error, magnification error, and resist misalignment, and the like of the optical systems are within predetermined ranges.

Generally, the conjugation length of reading optical systems A and B reaches about 600 mm. Therefore, if any of the positions of the line image sensors 21 and 22 and the imaging devices 23 and 24 is slightly shifted, a reading position on the read scanning lines $L_A$ and $L_B$ on the contact glass 10 may be shifted by one dot or more, which may degrade the read image quality. Particularly, the position shift may occur easily due to vibration upon the apparatus being moved and thermal expansion caused by the temperature change in the apparatus.

To overcome this circumstance, in this embodiment of the present invention, to detect the position shift of the reading position of the line image sensors 21 and 22 in the overlapped reading portion M, each light emitted from plural light sources 27 capable of being turned ON and OFF independently is converged to form a light spot S on the overlapped reading portion M of the reading optical systems A and B by an imaging device 28 which is optical means such as a lens.

As the plural light sources 27, a light emitting diode array (LEDA), a laser diode array (LDA), and a vertical cavity surface emitting laser array (VCSEL) may be used.

Figure 3:
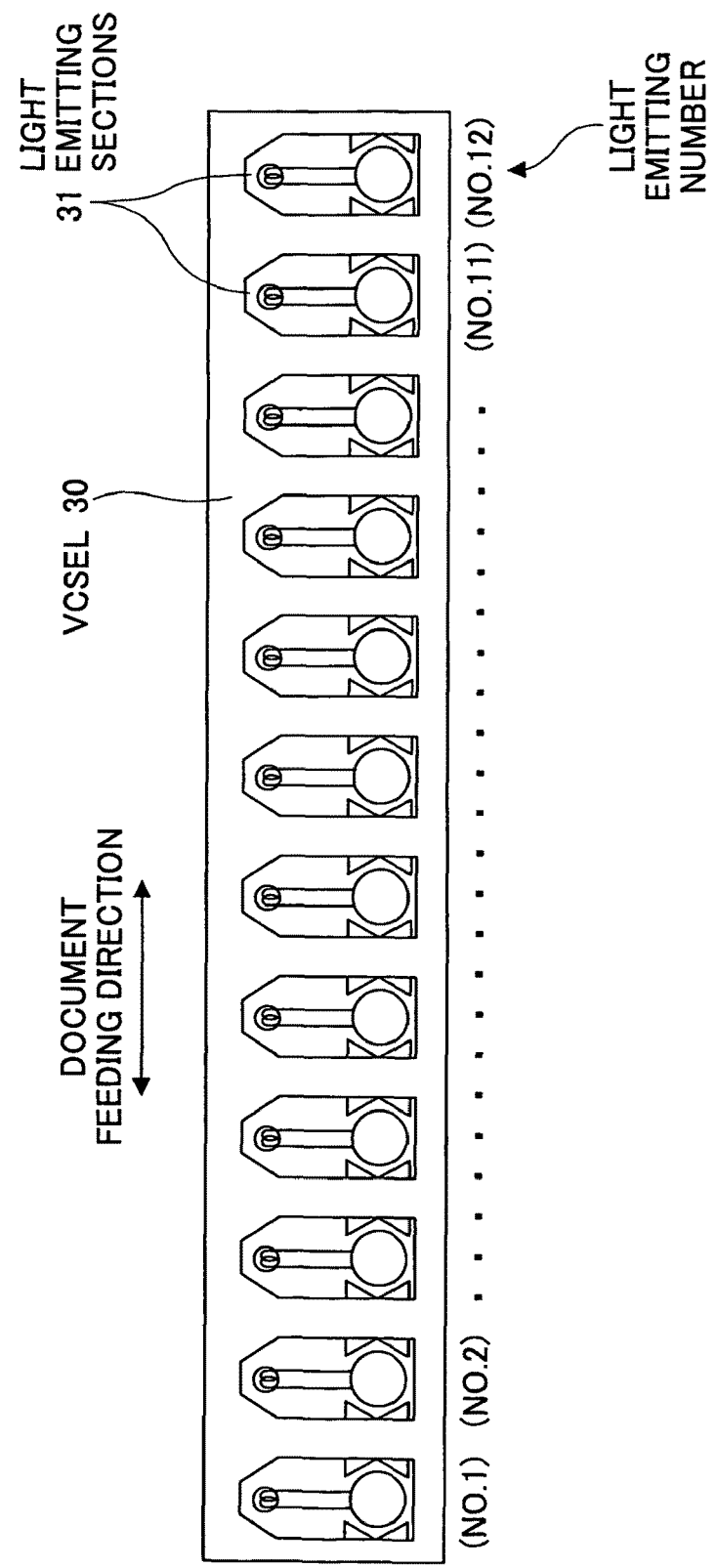
FIG. 3 is a drawing showing an exemplary configuration of a vertical cavity surface emitting laser (VCSEL) used in the image reading apparatus according to an embodiment of the present invention.

FIG. 3 shows an example of a light emitting section of the vertical cavity surface emitting laser array (VCSEL) 30. As shown in FIG. 3, in this example, the VCSEL 30 includes 12 units of light emitting sections 31 with the distance between adjacent light emitting sections being 250 µm. Each light emitting section 31 independently emits light in the direction orthogonal to the drawing plane. The entire length of the light emitted from the light emitting sections 31 is about 2.8 mm.

In the following, examples using VCSEL are described. However, the present invention is not limited to a configuration using the VCSEL. For example, the LDA may be used without departing the generality (scope) of the present invention. The VCSEL may be formed at a lower cost because the VCSEL may be formed as an array on a wafer surface without forming an oscillation mirror on the cleavage plane unlike an edge emitting laser.

Each light emitting section 31 as the light source of the VCSEL 30 is arranged in a manner so that the position of the light emitting section 31 is approximately conjugate with a position where the document D feeds on the contact glass 10. Generally, the size of the light emitting sections 31 of the VCSEL 30 is in a range between 10 μm and 20 μm, and, unlike an edge emitting laser, the shape of the light emitting portion is substantially circular. A light emitting point of the light emitted from each light emitting section 31 is projected onto a position where the document D feeds on the contact glass 10 as a light spot S. Twelve (12) light emitting sections 31 of the VCSEL 30 are arranged in the direction parallel to the document feeding direction on the contact glass 10.

Further, as shown in FIG. 2, each of twelve (12) light emitting sections 31 of the VCSEL 30 is sequentially turned ON and OFF by turn-on controlling means 32 in a manner so that the light spots S are sequentially converged and imaged in the document feeding direction within the overlapped reading portion M. In this case, the width (distance) in the document feeding direction between the position where the first light spot S is imaged and the position where the last (12th) light spot S is imaged is arranged to be greater than the assumed maximum amount (distance) of the position shift (misalignment) caused by thermal deformation, vibration, and the like.

Figure 4:
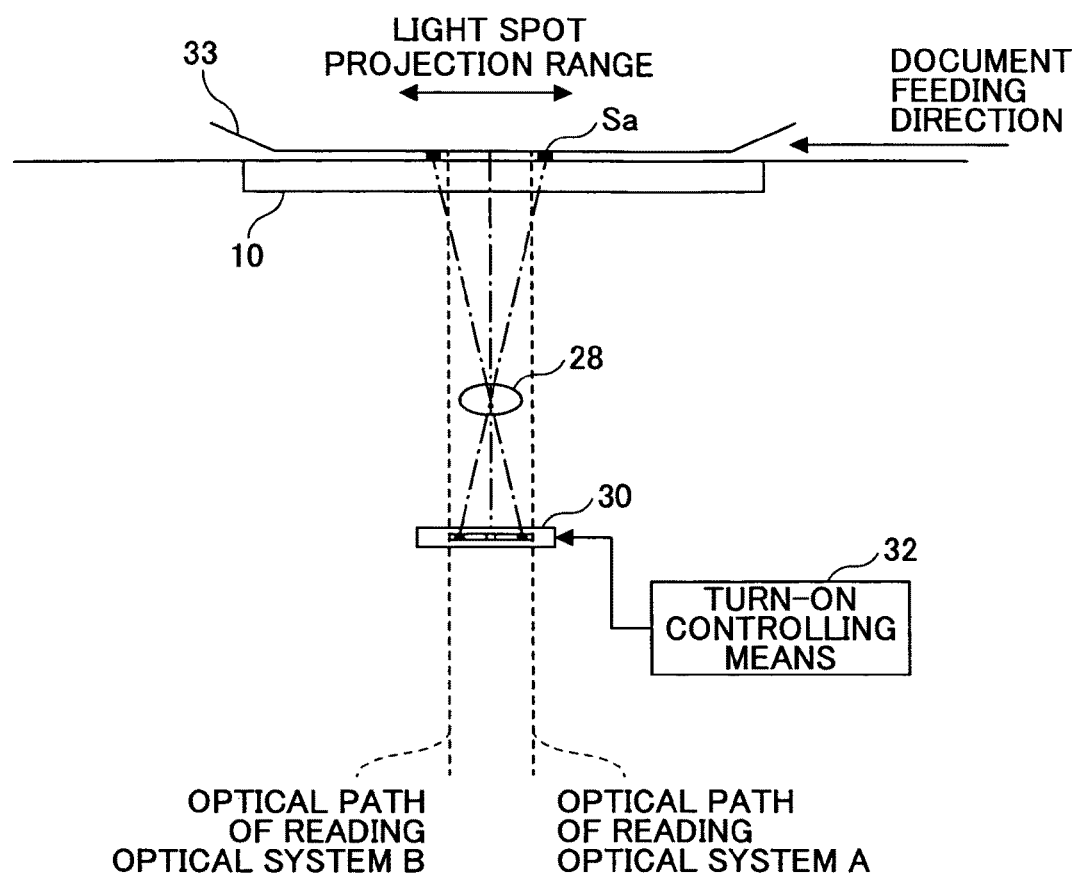
FIG. 4 is a drawing showing a document pressing member used in the image reading apparatus according to an embodiment of the present invention.
Figure 5:
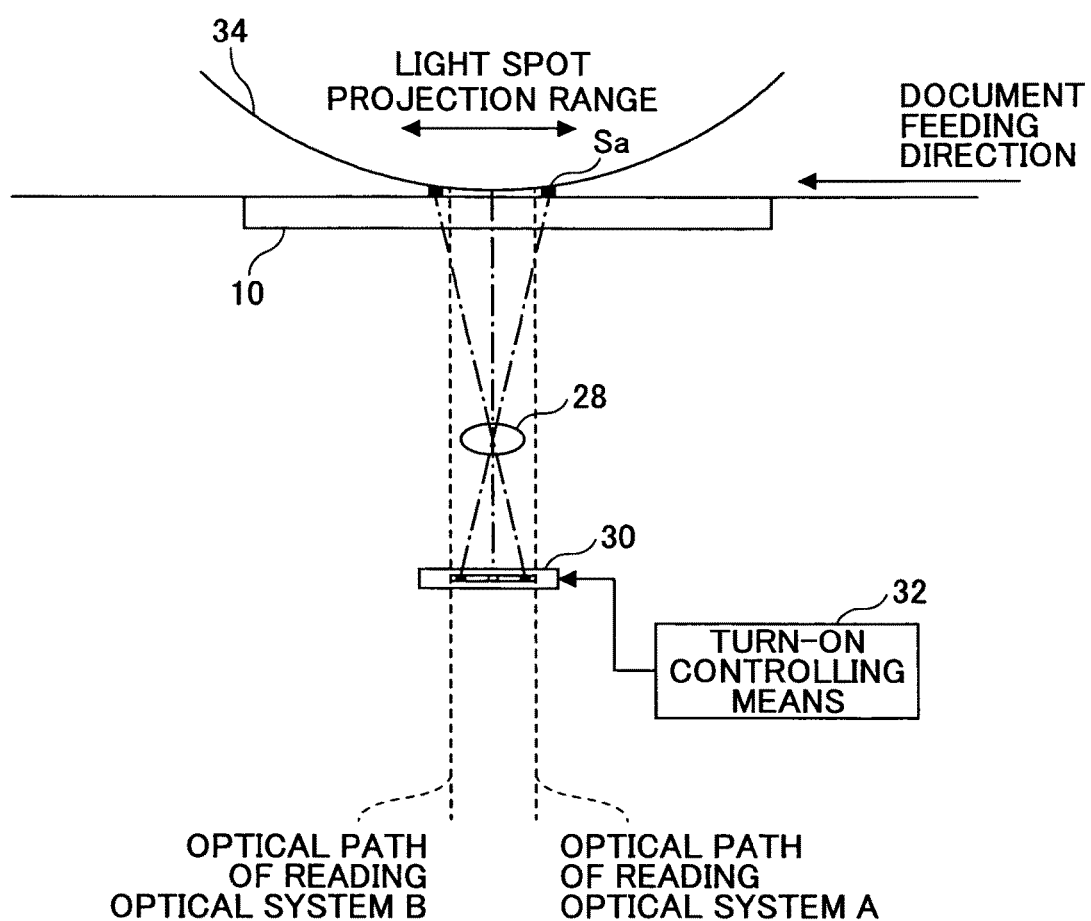
FIG. 5 is a drawing showing another document pressing member used in the image reading apparatus according to an embodiment of the present invention.

FIGS. 4 and 5 are diagrams showing configurations in the vicinity of the contact glass 10. In FIG. 4, a document pressing member 33 for pressing the document D to the contact glass 10 has a plane surface shape. On the other hand, in FIG. 4, a document pressing member 34 for pressing the document D to the contact glass 10 has a circular surface shape. In both configurations, when light paths in the sub scanning direction of the reading optical systems A and B are shifted, the reading positions in the sub scanning direction of the reading optical systems A and B are accordingly shifted, and the shifted light paths are shown in FIGS. 4 and 5 (actual shift may be at most 0.5 mm, and the figures are shown with exaggeration).

As shown in FIG. 2, the image processing section 26, the turn-on controlling means 32, and other sections are controlled by signals and data that are sent to and received from a central processing unit (CPU) 35.

Figure 6:
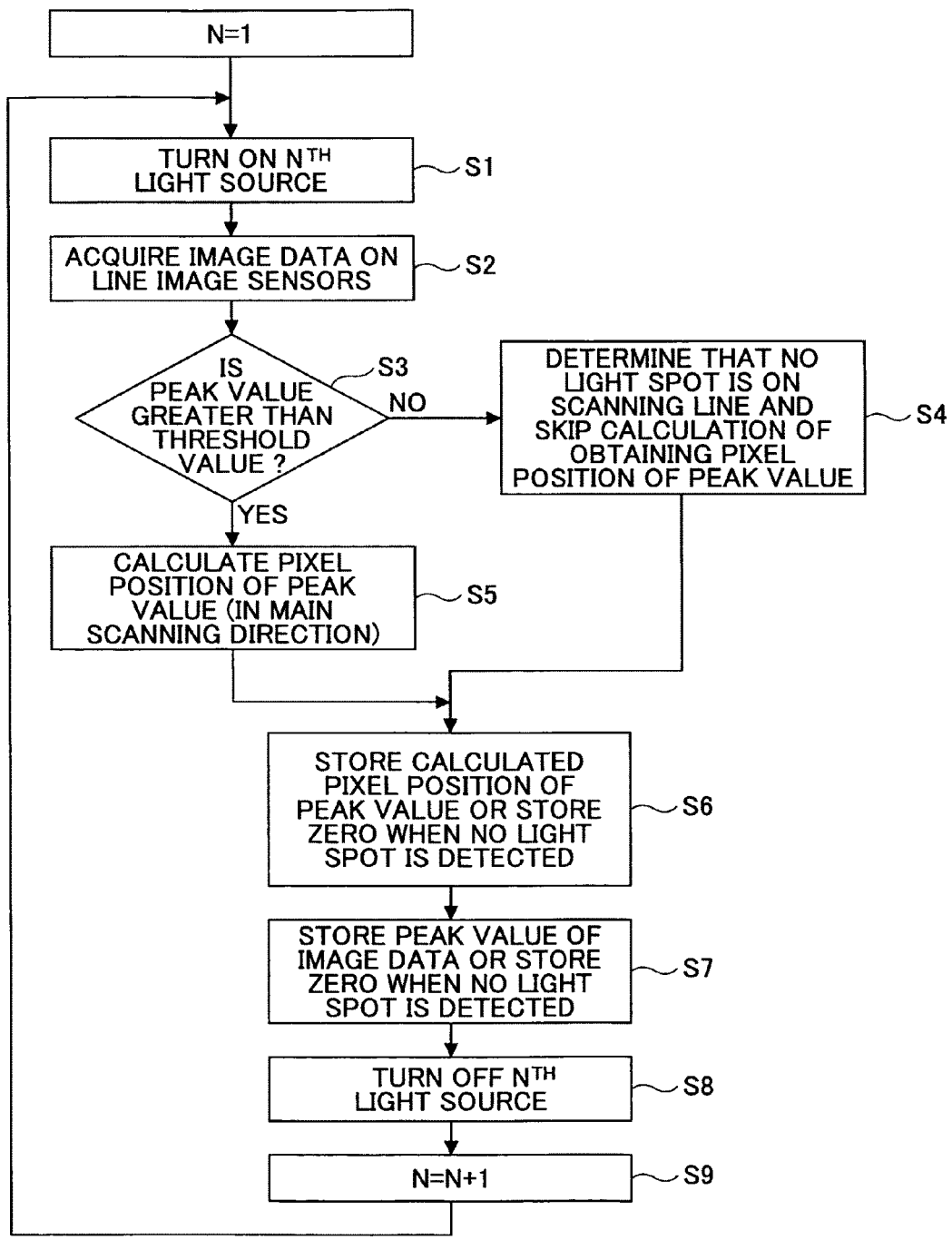
FIG. 6 is a flowchart showing a control process performed in the image reading apparatus according to an embodiment of the present invention.

Next, a control process performed by the CPU 35 as a main component, the image processing section 26, and the turn-on controlling means 32 according to an embodiment of the present invention is described with reference to the flowchart of FIG. 6.

Herein, the number of the light emitting sections 31 is denoted as N. First, while no document is placed on the contact glass 10, a value "1" is set to N (i.e., N=1), so that the first light emitting section 31 is turned ON. As shown in FIGS. 4 and 5, the converged lights of the light spots (imaging point) Sa are formed on the document pressing members 33 and 34 (step S1).

Figure 7:
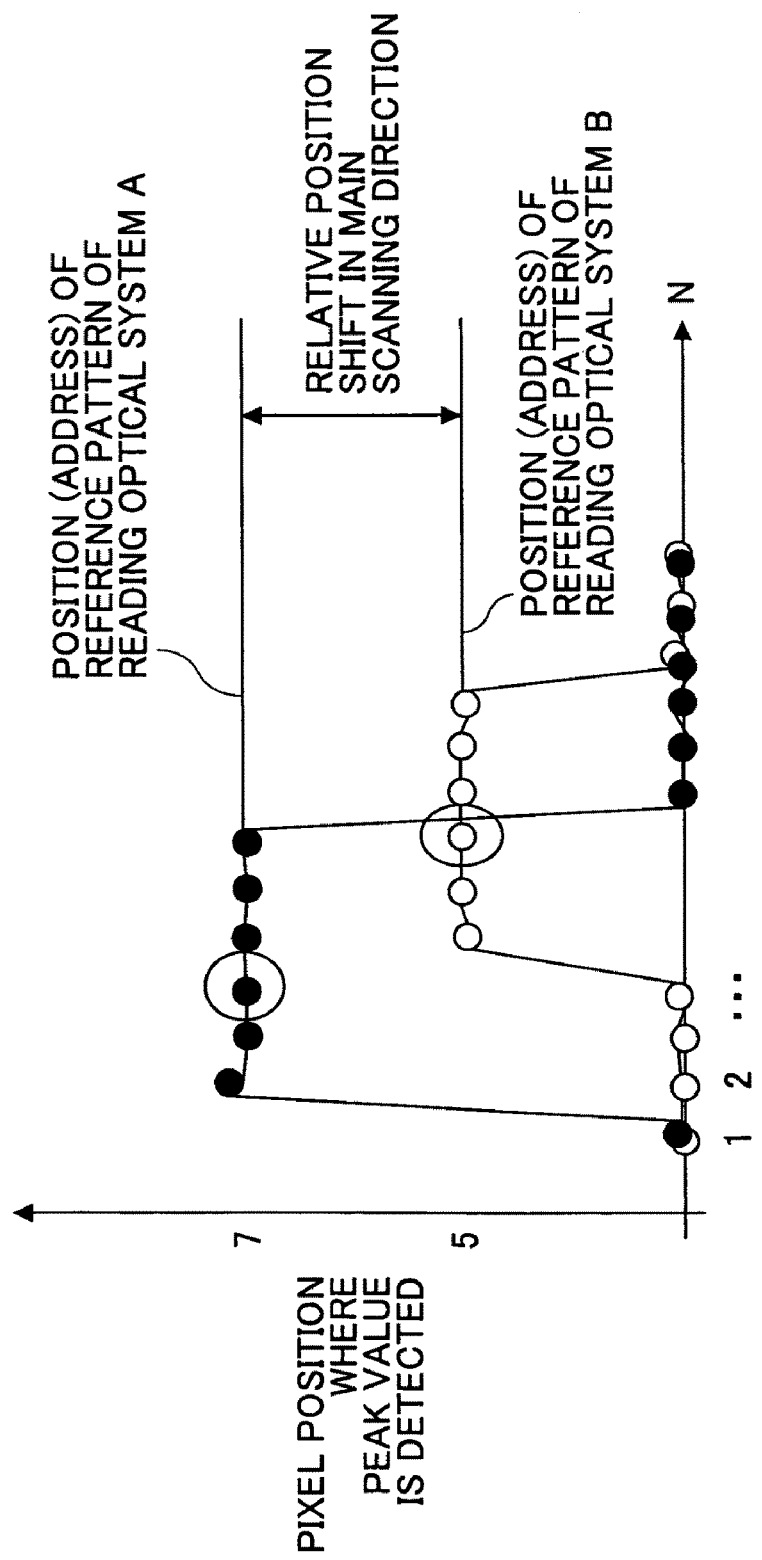
FIG. 7 is a graph showing positions at which peak values are detected by the line image sensors in an emitted light point pattern (reference pattern)

Next, the image processing section 26 acquires image data from the line image sensors 21 and 22 (step S2, see FIG. 7). The image data read when the lighted light emitting section No. is 1 (N=1) are shown in the first data columns in FIGS. 9A and 9B. In FIG. 9B, all data in the first data column is zero (0), because the light path of line image sensor 22 is far from the first light spot Sa.

On the other hand, in FIG. 9A in the first data column (where lighted light emitting section No. is 1), some values greater than zero (o) are shown as the image data from the line image sensor 21. The maximum value is present in the vicinity of pixel No. 7. This is because the light path of line image sensor 21 is closer to the first light spot Sa.

Next, the CPU 35 determines whether the light spot Sa is on the read scanning lines $L_A$ and $L_B$ based on whether the peak value of the image data is greater than a threshold value (YES or NO in step S3).

When the threshold value is 50, no image data in the first data column lines in both FIGS. 9A and 9B is greater than the threshold value (50) (two circles (black one and white one) on left-end side in FIG. 7, NO in step S3), therefore the calculation for determining the peak pixel position is skipped (step S4), and a value zero (0) is stored in a memory (not shown, may be a memory connected to the CPU 35 or the like) (step S6).

Next, the peak data of the image data are stored. In this case, the peak data is compared with a threshold value to determine whether the peak value is stored. For example, when the threshold value is 15, all the data in the first data column lines in both FIGS. 9A and 9B is less than 15, therefore, a value zero (0) is stored in the memory (two points on left-end side in FIG. 8) (step S7).

This comparison using a threshold value is necessary in order to avoid inaccurate calculation to determine the position using a noise value in low S/N environment.

Finally, the first light emitting section 31 of the VCSEL 30 is turned OFF to complete scanning the first line in response to the first light emitting section 31.

After the value N is increased by one (1) (N=N+1, step S9), the step goes back to step S1 to repeat the same procedure as described above.

Next, a process when N=4 is described with reference to FIG. 6. In this process, the fourth light emitting section 31 of the VCSEL 30 is turned ON by the turn-on controlling means 32 (step S1). The image processing section 26 acquires image data from the line image sensors 21 and 22 (step S2). The acquired imaged data are shown in the fourth data columns in FIGS. 9A and 9B. As shown in FIG. 9A, the peak value read by the line image sensor 21 of the reading optical system A is 220, which is greater than the threshold value 50 (YES in step S3). Therefore, the CPU 35 determines that the light spot Sa is on the read scanning line $L_A$ and performs the calculation to obtain the position of the light spot. As a result of the calculation, the position of the light spot corresponds to the position of the pixel No. 7 where the maximum image data value is detected (step S5).

In this calculation, a linear interpolation method, a spline interpolation method, and the like may be used. In such a case, the position of the light spot may be determined with higher resolution than one pixel resolution from those acquired values of pixels. The calculated (obtained) position is shown in the fourth black circle from the left end side in FIG. 7 (step S6).

On the other hand, as shown in FIG. 9B, the peak value read by the line image sensor 22 of the reading optical system B is 13, which is less than the threshold value 50 (NO in step S3). Therefore, a value zero (0) indicating that no light spot Sa is on the read scanning line $L_B$ is stored and shown in the fourth white point from the left end side in FIG. 7 (step S7).

Figure 8:
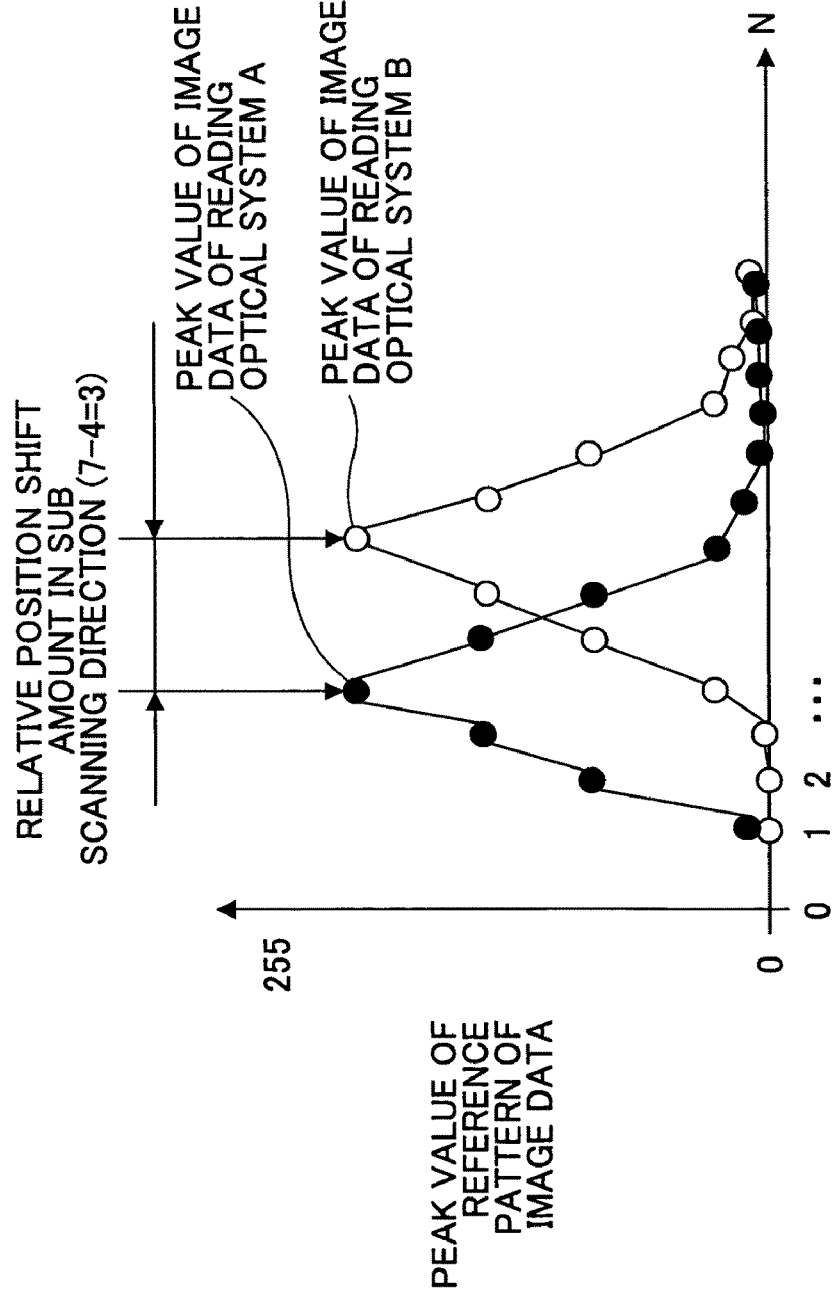
FIG. 8 is a graph showing peak values detected by the line image sensors in an emitted light point pattern (reference pattern)

Next, the peak values 220 and 13 of the image data of both of the line image sensors 21 and 22 in the overlapped reading portion M are stored and shown in the fourth black and white, respectively, circles from the left end side in FIG. 8. After the image data are stored, the fourth light emitting section 31 of the VCSEL 30 is turned OFF (step S8). In the following, the procedure described above is repeated until the process with respect to the last (twelfth) light emitting section 31 of the VCSEL 30 is completed (step S9).

After the processes with respect to all the light emitting sections 31 of the VCSEL 30 are completed, all the image data are obtained shown in FIGS. 7 and 8. As FIG. 8 shows, the peak value of image data read by the line image sensors 21 of the reading optical system A is 220, which is obtained when the fourth light emitting section 31 of the VCSEL 30 is turned ON. This data is shown in the fourth black circle from the left end side. On the other hand, the peak value of image data read by the line image sensors 22 of the reading optical system B is also 220, which is obtained when the seventh light emitting section 31 of the VCSEL 30 is turned ON. This data is shown in the seventh white circle from the left end side.

Based on the results above, the relative displacement (position shift) in the sub scanning direction can be obtained based on the difference between the positions where the maximum values are read. In this case, the difference is obtained by the calculation (7−4=3). Namely, the obtained displacement in the sub scanning direction corresponds to the distance of three times the distance between adjacent light emitting sections. As described above, when an appropriate interpolation method is applied, the displacement may be obtained with a resolution higher than a resolution of one distance (interval) between adjacent light emitting sections.

In this case, for example, when the magnification at the optical spots is two times that in the VCSEL 30 with respect to the imaging device 28, the distance between adjacent optical spots is twice as that between adjacent light emitting sections 31 of the VCSEL 30 (in this example, 250 μm). The detected displacement in the sub scanning direction is obtained by the calculation (3(intervals)×250 μg m×2=1500 μm).

On the other hand, the displacement (position shift) in the main scanning direction can be obtained based on the positions (i.e., pixel No) where the optical spots are detected in FIG. 7 (seventh (7) pixel with respect to the line image sensor 21 of the reading optical system A and fifth (5) pixel with respect to the line image sensor 22 of the reading optical system B) at the number of the light emitting sections when the maximum image data is detected (fourth light emitting section with respect to the line image sensor 21 of the reading optical system A and seventh light emitting section with respect to the line image sensor 22 of the reading optical system B). As a result, the displacement in the main scanning direction is obtained by the calculation (7−5=2) as two (2) times the distance between adjacent pixels.

When a reading resolution is given as 600 dpi, the distance between the pixels is 24.5 mm/600=0.0423 mm. Therefore the actual displacement (position shift) in the main scanning direction is calculated 0.0423 mm×2=84.6 μm.

Figure 10A:
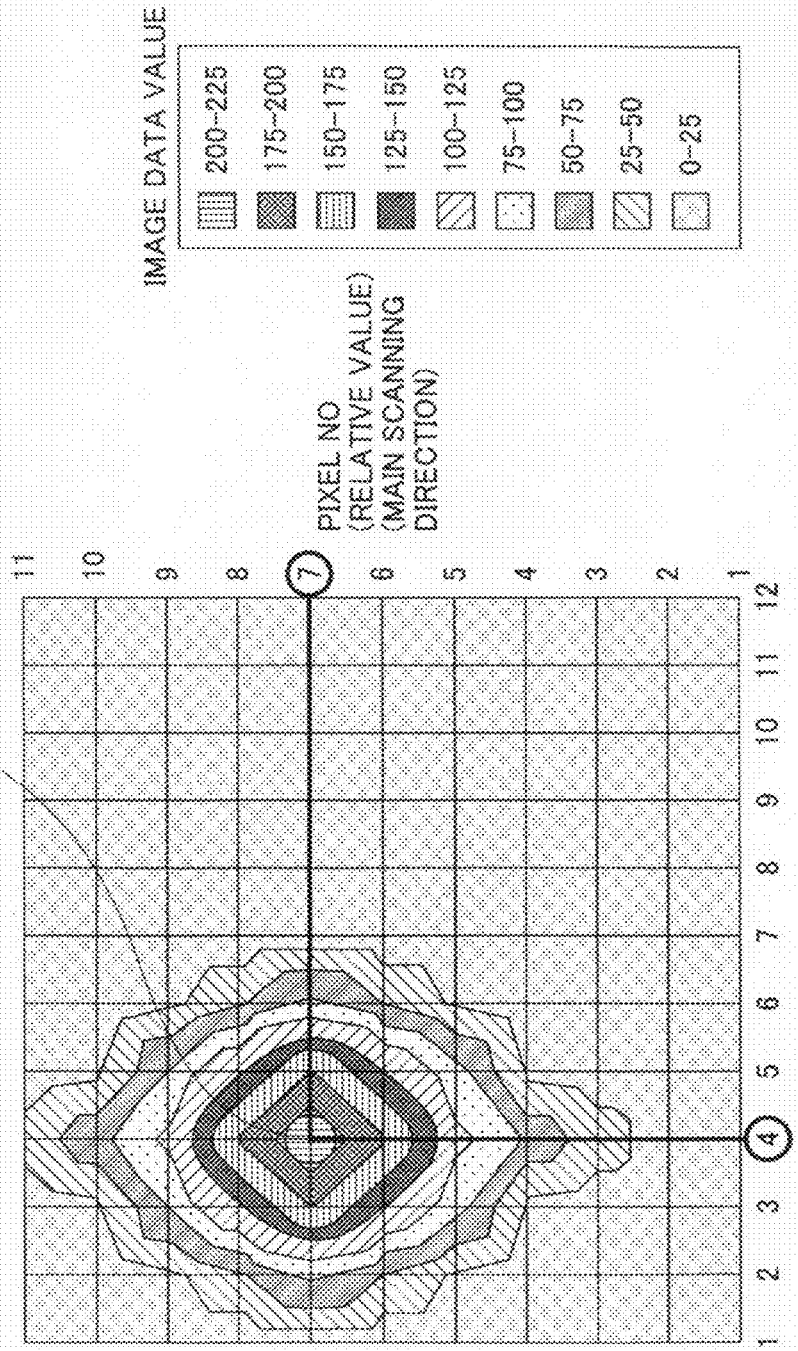
FIGS. 10A and 10B are graphs showing two-dimensional contour lines of the image data values detected by the line image sensors 21 and 22, respectively.
Figure 10B:
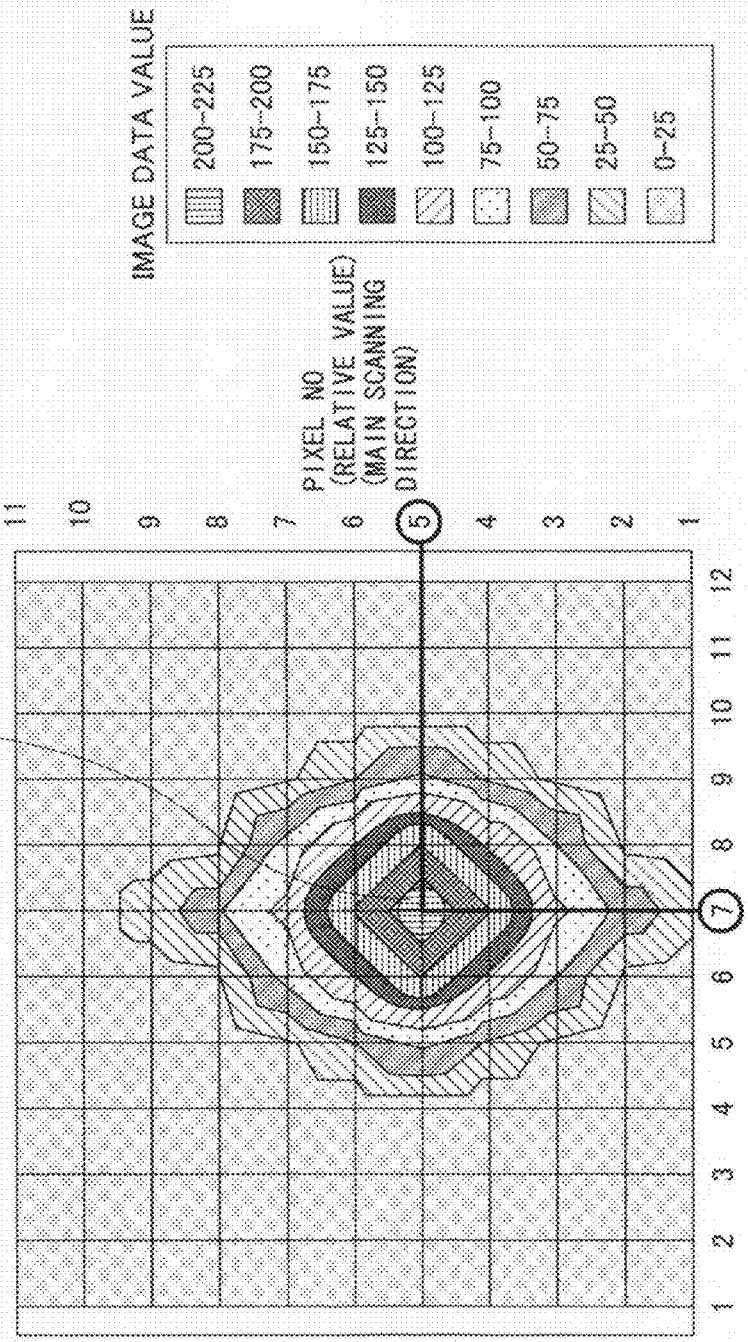

In this case, the stored data may be listed in tables as shown in FIGS. 9A and 9B, wherein the x axis represents the pixel number of the pixels arranged in the main scanning direction and the y axis represents a number of light emitting sections 31 of the VCSEL 30 arranged in the sub scanning direction. Further, when the stored data are plotted in the x-y coordinate system, the stored data may be displayed using contour lines as a two-dimensional view as shown in FIGS. 10A and 10B. Further, by interpolating the peak values arranged in the two-dimensional array, the positions of the peak values in main and sub scanning directions may be calculated.

During the entire processes, it is not necessary to use any mechanical movement operations unlike the invention described in Patent Document 3. Therefore, it may become possible to complete the entire processes within a very short period such as less than one second and perform the adjustment procedure any time without interrupting reading (scanning) operation or any other operations.

The operations described above may be performed in the same manner regardless of the shape of the document pressing members 33 and 34, i.e., even when the document pressing members 33 having a plane surface shape as shown in FIG. 4 or the document pressing member 34 having a circular surface shape as shown in FIG. 5 is used.

As described above, according to the embodiment of the present invention, by sequentially turning ON and OFF the light sources aligned in the sub scanning direction and capable of being independently turned ON and OFF, the position shifts (displacements) in both the main and the sub scanning directions may be detected simultaneously. Further, there is no driving unit necessary to mechanically move any portion during the above processes performed in the apparatus according to the embodiment of the present invention. As a result, it may become possible to correct the position shift in the overlapped reading portion of the line image sensors in a short time period.

Figure 11:
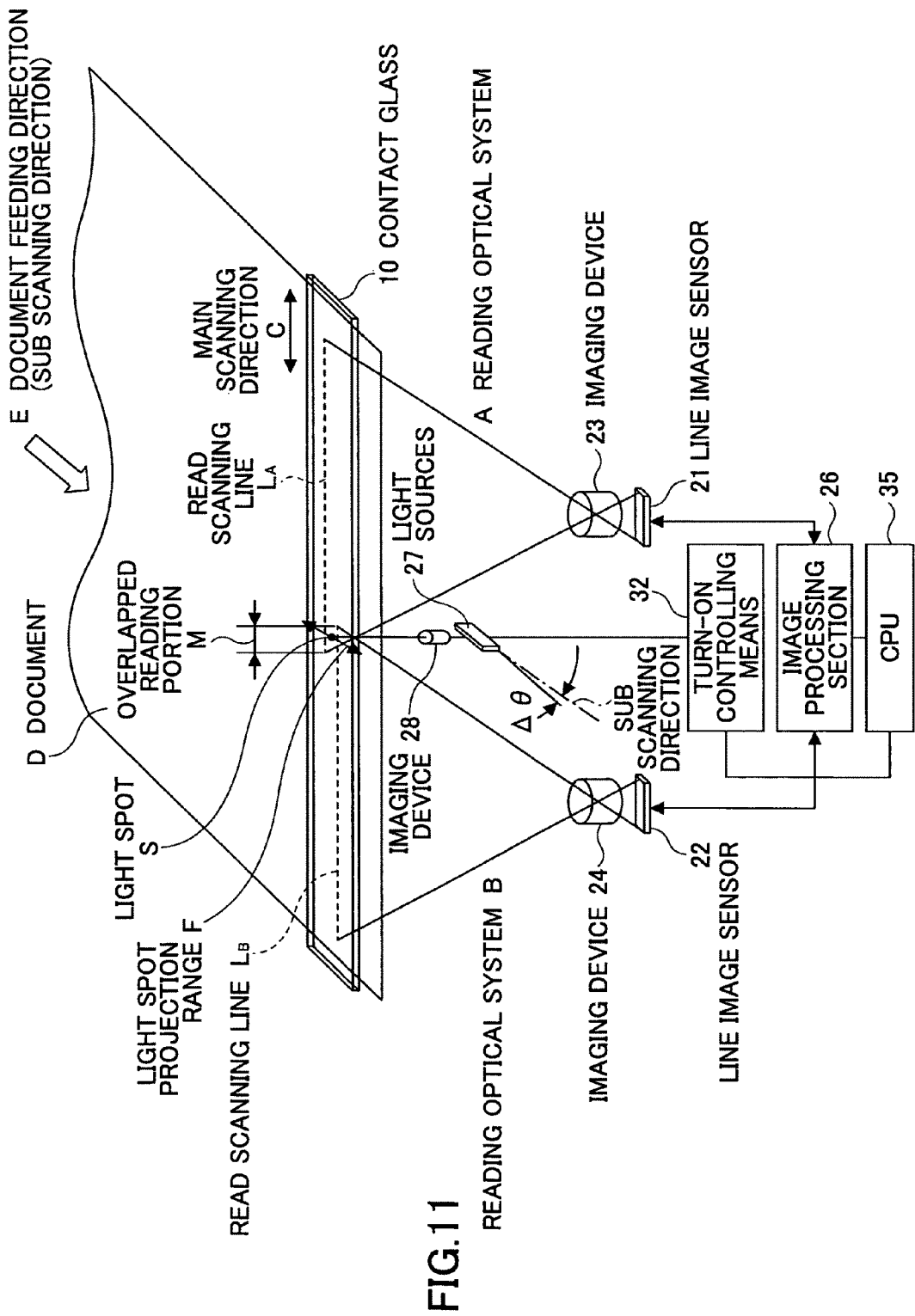
FIG. 11 is a perspective view showing a basic configuration of an image reading apparatus according to another embodiment of the present invention.

However, as shown in FIG. 11, in a case where there is an angle error $\Delta\theta$ generated between the aligning direction of the light emitting sections 31 (Nos. 1 through 12) of the VCSEL 30 and the sub scanning direction, when the position shift in the sub scanning direction is given as $\Delta Y$, the number of pixels corresponding to a joining error in the main scanning direction given as $\Delta X(=\Delta Y \times \tan(\Delta\theta))$ is shifted.

For example, when there is the angle error $\Delta\theta=5$ degrees generated when, for example, the light emitting sections 31 is mounted and the position shift on a reading surface in the sub scanning direction is given as 500 μm, the detection error in the main scanning direction is $\Delta X(=500 \times \tan(5 \text{ degrees}))$ =43.7 μm, which corresponds to the position shift of about one dot. The amount of the position shift in the main scanning direction increases in proportion to the amount of the position shift in the sub scanning direction. Therefore, if the amount of the position shift in the sub scanning direction increases, the amount of the position shift in the main scanning direction notably increases, thereby degrading the image quality.

To overcome the problem, an exemplary configuration according to another embodiment of the present invention is described with reference to FIGS. 11 and 12. In the figures, the same reference numerals are commonly used with respect to the same or equivalent elements in FIGS. 1 through 10, and the repeated descriptions in detail thereof are omitted.

In the following, a correcting method is described, where there is the angle error $\Delta\theta$ between the aligned direction of the plural light sources 27 (light emitting sections 31 of the of the VCSEL 30) and the sub scanning direction generated when, for example, the plural light sources 27 are mounted.

In a practical manufacturing process, it is not practically possible to completely eliminate the possibility of generating errors (position shift). Therefore, generally, it is important to consider measures to reduce the influence of the angle error generated when, for example, the plural light sources 27 are mounted.

Therefore, a case is considered where the VCSEL 30 is mounted so that the angle error $\Delta\theta$ is generated. In this case, due to this angle error, the shape and the direction of the light spots aligned on the line image sensors 21 and 22 of the reading optical systems A and B, respectively, and the reading surface are as shown in FIG. 12.

Figure 12:
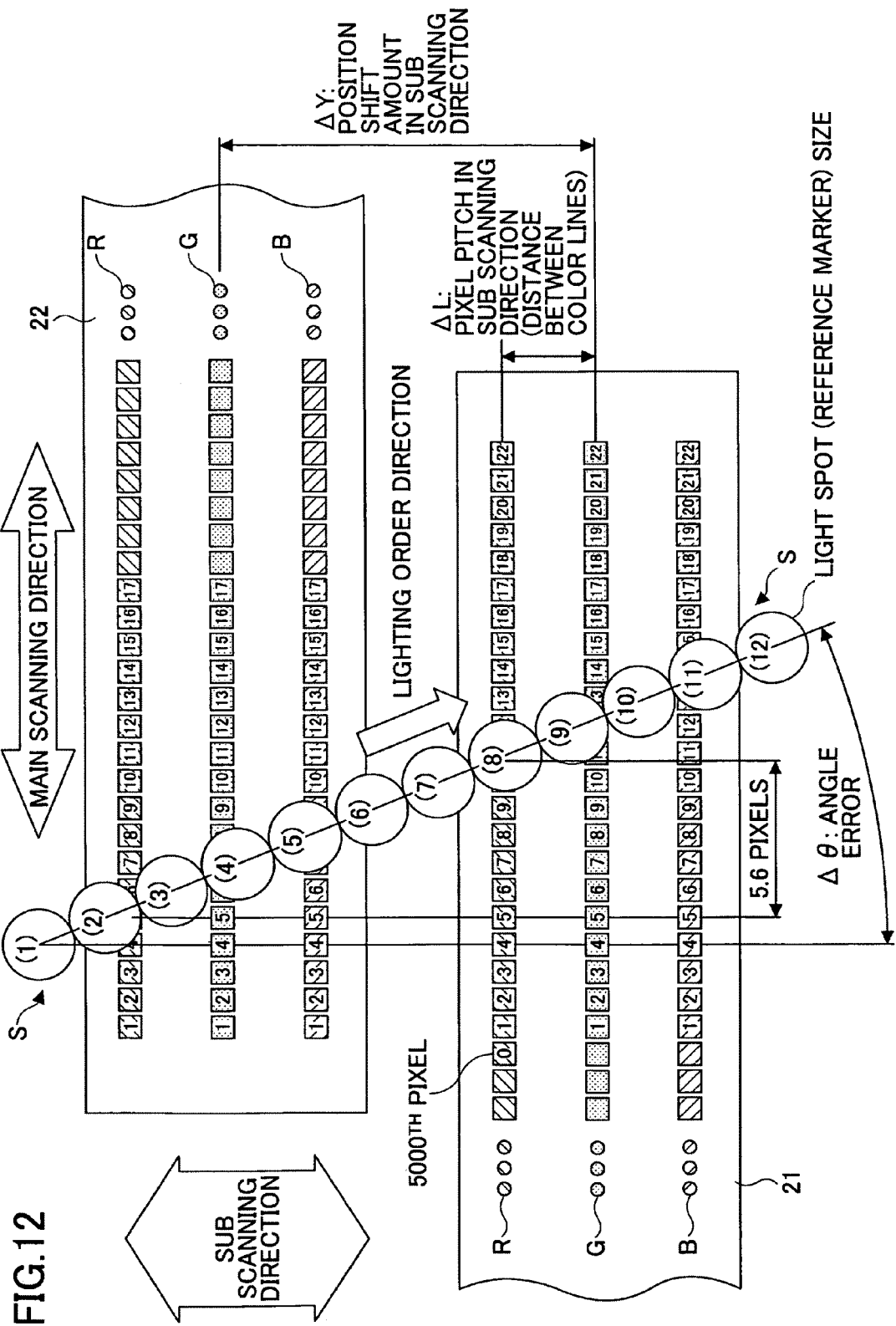
FIG. 12 is a drawing showing a relationship between the light spots and color line image sensors when the VCSEL is set with an angle error in the image reading apparatus according to the embodiment of the present invention.

In this example, as shown in FIG. 12, the line image sensors 21 and 22 are color line image sensors having red (R), green (G), and blue (B) color reading lines. The amount of position shift in the sub scanning direction of the line image sensors 21 and 22 is given as $\Delta Y$, and a line distance between adjoining color reading lines in the line image sensors 21 and 22 is given as $\Delta L$.

The light spots S are sequentially formed downward from the upper side of FIG. 12 in the order of (1) through (12). In this case, the diameters of the light spots S on the reading surface and the line image sensors 21 and 22 are set about 127 μm and about 30 μm, respectively. These set values may be slightly different from those used in the descriptions in the previous embodiment of the present invention. However, the generality of the present invention is not impaired even though such values are herein selected and used. Further, generally, the size (diameter) of the light spots and the distance between adjacent spot lights may be arbitrarily set by selecting appropriate VCSEL and setting appropriate magnification of the imaging (reading) optical systems.

When the position shift in the main scanning direction with respect to the red (R) line of the line image sensor 22 is detected based on the same procedure described in the configuration having no angle error according to the previous embodiment of the present invention, as shown in FIG. 12, when the second spot light is turned ON, the peak value is detected at 5.2 pixels of the red (R) line of the line image sensor 22 of the reading optical system B, and the peak value 5.2 is stored as the data indicating the position on which the light spots (reference marker) pass (formed). Then, the light spots are sequentially turned ON and OFF. When the eighth light spot is turned ON, the peak value is detected at 5010.8 pixels of the red (R) line of the line image sensor 21 of the reading optical system A, and the peak value 5010.8 is stored as the value indicating the position on which the light spots (reference marker) pass (formed).

If the joining process is performed without any process of correcting the angle error, the data of the 225.2 pixel of the line image sensor 22 of the reading optical system B and the data of the 5010.8 pixel of the line image sensor 21 of the reading optical system A are joined to each other. As a result, about 5.6 pixels of position shift remains without being corrected, which may disadvantageously produce a streak line on the read image.

To overcome the circumstances, in a second embodiment of the present invention, when there is the angle error $\Delta\theta$ generated in the mounting process or the like, the angle error $\Delta\theta$ is detected using the three color (RGB) reading lines within a single color image sensor.

More specifically, in the case of FIG. 12, when the second (2) spot light is turned ON, the data indicating that the spot light is formed on a 5.2 pixel of the red (R) line of the line image sensor 22 of the reading optical system B is stored. In the same manner, when the fifth (5) spot light is turned ON, the data indicating that the spot light is formed on an 8 pixel of the blue (B) line of the line image sensor 22 of the reading optical system B is stored.

In FIG. 12, the symbol $\Delta L$ denotes the distance between the color lines (line distance). In this example, the distance between the adjacent pixels is given as 10 μm, therefore, the angle error $\Delta\theta$ is obtained by the calculation of $\Delta\theta=\tan^{-1}\{(8-5.2)\times 10/\Delta L\}$. When the line distance $\Delta L$ is given as $\Delta L=40\times 2=80$ μm, the angle error $\Delta\theta=19.3$ degrees is obtained. While this obtained angle error ($\Delta\theta$) is stored and by using the angle error ($\Delta\theta$) along with the amount of position shift in the sub scanning direction ($\Delta Y$), the amount of position shift ($\Delta X$) in the main scanning direction to be corrected due to the angle error is obtained by the calculation of $\Delta X=\Delta Y\times\tan(\Delta\theta)$.

For example, when the amount of position shift ($\Delta Yccd$) on the line image sensor in the sub scanning direction is given as $\Delta Yccd=160$ μm, the amount of position shift ($\Delta X$) in the main scanning direction to be corrected is calculated by the calculation of $\Delta Xccd=160\times\tan(19.3$ degrees$)=56$ μm$=5.6$ pixels.

As a result, the 5.2 pixel data of the line image sensor 22 of the reading optical system B and the 5005.2 pixel data that is calculated by $5010.8-5.6=5005.2$ of the line image sensor 21 of the reading optical system A are joined to each other. By doing this, the position shift in the main scanning direction due to the angle error may be eliminated, and therefore an excellently joined image data may be obtained.

In the above example, only the amount of position shift with respect red (R) line is obtained. However, the same procedure may be additionally performed with respect to the green (G) line and the blue (B) line. By separately obtaining the amount of position shift with respect to each of the three RGB colors, a more accurate joining result may be obtained.

Further, by performing the above process, the angle between a straight line on which the light spots S are sequentially turned ON and OFF and each of the color line image sensors 21 and 22 is obtained. As a result, a relative angle between the color line image sensors 21 and 22 may also be obtained. When this relative angle between the color line image sensors 21 and 22 is large, the read image may be degraded because the scanning lines of the image are bent in the center (joining) portion.

To overcome the problem, based on the obtained relative angle, the image data may be resampled so as to maintain the linearity of the data. To that end, a resampling method described in Japanese Patent Application Publication No. H9-240060 may be used.

Next, a method of correcting an image data based on the results of detected amounts of position shift is described.

When the correction is to be performed pixel by pixel (by one-pixel resolution), the correction may be performed simply by changing the addresses of image data. Further, when a correction processing (interpolation processing) capable of correcting in less than one pixel resolution is required, the correction may be performed by resampling in less than one pixel resolution by a method as described in Japanese Patent No. H9-240060.

As the methods of resampling, a two-dimensional interpolation may be conducted by using such as the three-dimensional convolution method, the sync function interpolation method, and the straight line interpolation. In such a case, advantageously, correction in both the main and the sub scanning directions may be corrected at the same time.

According to the embodiments of the present invention, each processing, arithmetic processing, control, and the like with respect image data and operations of elements may be provided by the image processing section 26 and the CPU 35 (see FIG. 2). When image data are being read, the image processing section 26 performs data processing such as joining the image data in the overlapped reading portion based on the read image data to form and output the entire image data.

Further, the arithmetic processing function as position shift detecting means, the judging processing function to adjust the pixel position on the line image sensors and the timing to read data, the correcting processing function to correct position information, the arithmetic processing function for interpolating image data, and the like may be configured in the image processing section 26 and the CPU 35. These means for conducting the functions may be independently provided.

The present invention may be applied to, for example, a document reading apparatus for reading a document in an image forming apparatus such as a copier, a facsimile machine, and a scanner and an image reading apparatus for reading various images.

According to another embodiment of the present invention, the position shift detecting unit may detect relative positional information of each light emitted from the light sources and detect the position shift of the reading position of the line image sensors based on the data of the overlapped reading portion read by the line image sensors.

By using this configuration to detect light converged positions, it may become possible to provide an image reading apparatus having high durability and accuracy and capable of detecting and correcting the amounts of the position shift in the sub scanning direction as well without mechanically moving the light converged positions.

According to another embodiment, the image reading apparatus may further include an adjusting unit configured to adjust at least one of a pixel position on the line image sensors and a timing to read data based on the information with respect to the detect position shift of the reading position.

By having this configuration, image data may be stably read without being degraded by position shift at any time.

According to another embodiment of the present invention, the image reading apparatus may further include a positional information correcting unit configured to correct the relative positional information of the light emitted from the light sources, the relative positional information being detected by the position shift detecting unit, based on information indicating positions in the overlapped reading portion, the positions onto which the lights emitted from the light sources are projected.

By having this configuration, it may become possible to detect the position shift more accurately.

According to another embodiment of the present invention, the image reading apparatus may further include a joining position determining unit configured to determine a joining position of the read image data by one pixel resolution based on the detected relative positional information.

By having this configuration, based on detection values of the position shifts, a relative position and an absolute position may be corrected by one pixel resolution, thereby enabling higher accurate correction of the position shifts.

According to another embodiment of the present invention, the image reading apparatus may further include a correcting unit configured to correct a relative position shift by less than one pixel resolution using an image interpolation method based on the detected relative positional information.

By having this configuration, based on detection values of the position shifts, a relative position and an absolute position may be corrected by less than one pixel resolution, thereby enabling further higher accurate correction of the position shifts.

According to another embodiment of the present invention, the optical unit may converge the light emitted from the light sources onto the overlapped reading portion as a light spot.

By doing this, the shape of the imaged light becomes circular so that the contrast of the imaged light may be increased. As a result, the detection of the peak values may become easier, and the position may be detected more accurately.

According to another embodiment of the present invention, the plural light sources may be aligned on a straight line extending in the direction substantially parallel to a sub scanning direction.

By having this configuration, even when each reading position of the sensors is largely shifted in the sub scanning direction from an area of a reference pattern having a spot shape, a position on which each of the plural light source sequentially turning ON and OFF are projected in the vicinity of a reading surface can be sequentially moved on a straight line extending in the direction substantially parallel to a document feeding direction (sub scanning direction), and the sensors may read the position without being moved in the main scanning direction, thereby enabling detecting the amount of the position shift more accurately.

According to another embodiment of the present invention, the light source turn-on unit may turn ON the light source so that the position shift detecting unit detects the position shift, and the light source turn-on unit-may turn OFF the light source after image data with respect to the image to be read is read.

By having this configuration, only when the position shift is being detected, the light sources are turned ON. Therefore, there is no influence caused by the light sources because the light sources are turned OFF when an image of a document is read in a normal operation, and as a result, noise-free image data may be obtained.

According to another embodiment of the present invention, the plural light sources may be at least one of an LED array and a vertical cavity surface emitting laser array.

According to another embodiment of the present invention, the image reading apparatus may further include plural color line image sensors having different spectral sensitivities in the sub scanning direction, provided as the plural line image sensors, and partially overlapped with each other in a main scanning direction; and an angle detecting unit configured to detect a turn-on angle based on turn-on positions of the plural light sources, wherein the image data in the overlapped reading portion of the image data output from the plural color line image sensors are joined based on the detected turn-on angle.

By having this configuration, even when there is an error in a setting angle of the plural light sources capable of being controlled to turn ON independently, the error angle (error in the setting angle) may be detected and corrected.

According to another embodiment of the present invention, a joining process of joining the image data with respect to each color of the color line image sensors and a correction process in accordance with an angle error based on the detected turn-on angle may be performed.

By having this configuration, the position shift is detected with respect to each color of the color line image sensors, and the joining process is performed. Therefore, it may become possible to cancel errors in parts aligned in each line and perform the joining process to form a color image having an excellent image quality.

According to another embodiment of the present invention, each relative setting angle of the plural color line image sensors may be detected, and based on the detected relative setting angles, at least one of a position of the optical unit configured to converge each light emitted from the light sources onto the overlapped reading portion and the image data output from the color line image sensors may be corrected.

By having this configuration, each relative angle of the plural color line image sensors is detected, and based on the detected relative angles, at least one of the optical systems or image data is corrected so that the color line image sensors are aligned on a straight line. By doing this, the linearity of the sensor scanning may be maintained and highly accurate image data having an excellent quality may be obtained.

According to another embodiment of the present invention a document reading apparatus is provided that includes a document reading unit configured to optically read document image information, the document reading apparatus including an image reading apparatus as described above as the document reading unit.

By having this configuration, it may become possible to accurately read image data of a document in good condition.

According to another embodiment of the present invention, an image forming apparatus is provided that includes a document reading unit, wherein an image is formed onto a recording medium based on document information read by the document reading unit, the image forming apparatus including an document reading apparatus described above as the document reading unit.

By having this configuration, an image data having an excellent quality may be formed based on accurately read document image information in good condition.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2008-023747, filed on Feb. 4, 2008, the entire contents of which are hereby incorporated herein by reference.

What is claimed is:

1. An image reading apparatus comprising:
plural line image sensors aligned in a main scanning direction, the plural image line sensors aligned to read an image along scanning lines that include a partially overlapped reading portion, so that image data to be read are imaged on the line image sensors and entire image data are read by joining image data in the overlapped reading portion read by the line image sensors;
plural light sources disposed so as to face the overlapped reading portion of the image data to be read by the line image sensors, the plural light sources aligned in a straight line extending in a direction substantially parallel to a sub scanning direction;
a light source turn-on unit configured to sequentially and independently turn on the light sources;
an optical unit configured to converge each light emitted from the light sources onto the overlapped reading portion; and
a position shift detecting unit configured to detect a position shift of a reading position of the line image sensors in the overlapped reading portion based on data of the overlapped reading portion read by the line image sensors.

2. The image reading apparatus according to claim 1, wherein
the position shift detecting unit detects relative positional information of each light emitted from the light sources and detects the position shift of the reading position of the line image sensors based on the data of the overlapped reading portion read by the line image sensors.

3. The image reading apparatus according to claim 1, further comprising:
an adjusting unit configured to adjust at least one of a pixel position on the line image sensors and a timing to read data based on the information with respect to the detected position shift of the reading position.

4. The image reading apparatus according to claim 1, further comprising:
a positional information correcting unit configured to correct the relative positional information of the light emitted from the light sources, the relative positional information being detected by the position shift detecting unit, based on information indicating positions in the overlapped reading portion, the positions onto which the lights emitted from the light sources are projected.

5. The image reading apparatus according to claim 1, further comprising:
a joining position determining unit configured to determine a joining position of the read image data by one pixel resolution based on the detected relative positional information.

6. The image reading apparatus according to claim 1, further comprising:
a correcting unit configured to correct a relative position shift by less than one pixel resolution using an image interpolation method based on the detected relative positional information.

7. The image reading apparatus according to claim 1, wherein
the optical unit converges the light emitted from the light sources onto the overlapped reading portion as a light spot.

8. The image reading apparatus according to claim 1, wherein
the light source turn-on unit turns ON the light source so that the position shift detecting unit detects the position shift, and
the light source turn-on unit turns OFF the light source after image data with respect to the image to be read is read.

9. The image reading apparatus according to claim 1, wherein
the plural light sources are at least one of an LED array and a vertical cavity surface emitting laser array.

10. The image reading apparatus according claim 1, further comprising:
plural color line image sensors having different spectral sensitivities in the sub scanning direction, provided as the plural line image sensors, and partially overlapped with each other in a main scanning direction; and
an angle detecting unit configured to detect a turn-on angle based on turn-on positions of the plural light sources, wherein
the image data in the overlapped reading portion of the image data output from the plural color line image sensors are joined based on the detected turn-on angle.

11. The image reading apparatus according claim 10, wherein
a joining process of joining the image data with respect to each color of the color line image sensors and a correction process in accordance with an angle error based on the detected turn-on angle are performed.

12. The image reading apparatus according to claim 10, wherein
each relative setting angle of the plural color line image sensors is detected, and
based on the detected relative setting angles, at least one of a position of the optical unit configured to converge each light emitted from the light sources onto the overlapped reading portion and image data output from the color line image sensors are corrected.

13. A document reading apparatus including a document reading unit configured to optically read document image information, the document reading apparatus comprising:
an image reading apparatus according to claim 1 serving as the document reading unit.

14. An image forming apparatus including a document reading unit, wherein an image is formed onto a recording medium based on document information read by the document reading unit, the image forming apparatus comprising: a document reading apparatus according to claim 13 serving as the document reading unit.

* * * * *